P. V. McCASH AND M. C. LEVINSON.
AUTOMATIC ELECTRIC CONTROLLER.
APPLICATION FILED SEPT. 21, 1918.
1,436,971.  Patented Nov. 28, 1922.
2 SHEETS—SHEET 1.
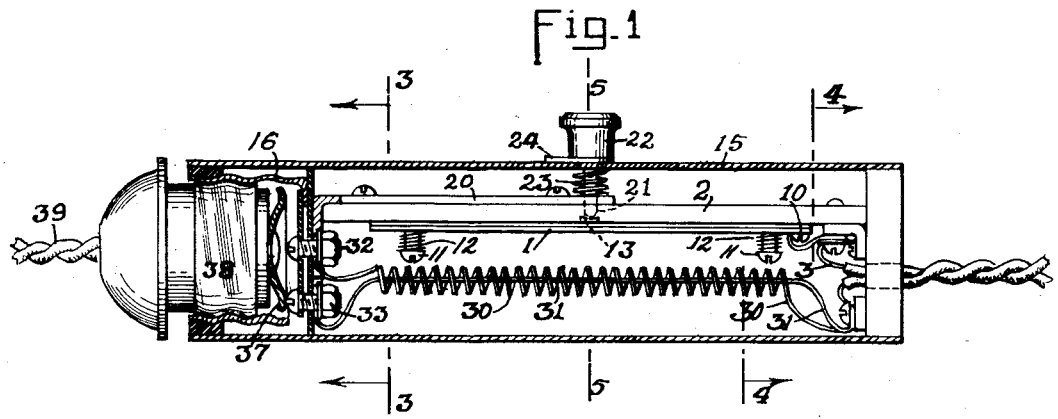
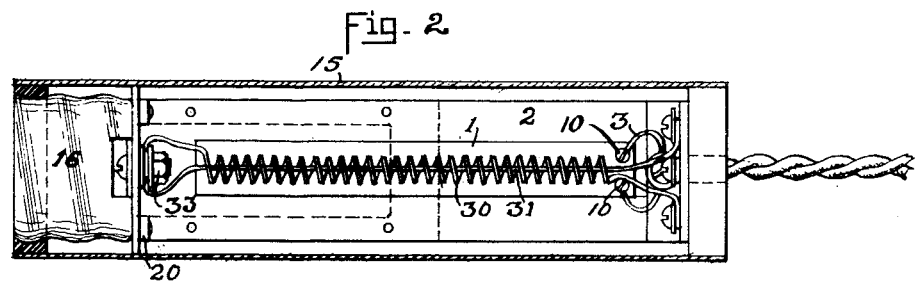
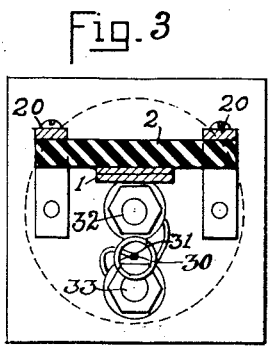
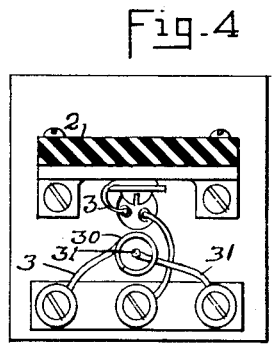
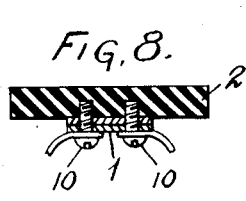
Inventor
Perry V. McCash
Maurice C. Levinson
By Henry L. Reynolds
Attorney Patented Nov. 28, 1922.

1,436,971

UNITED STATES PATENT OFFICE.

PERRY V. McCASH AND MAURICE C. LEVINSON, OF SEATTLE, WASHINGTON, ASSIGNORS, BY MESNE ASSIGNMENTS, TO FRANK D. FITTS, OF SELAH, WASHINGTON.

AUTOMATIC ELECTRIC CONTROLLER.

Application filed September 21, 1918. Serial No. 255,162.

*To all whom it may concern:*

Be it known that we, PERRY V. McCASH and MAURICE C. LEVINSON, citizens of the United States, and residents of the city of Seattle, county of King, and State of Washington, have invented certain new and useful Improvements in Automatic Electric Controllers, of which the following is a specification.

Our invention relates to devices which are employed for controlling an electric current in which the control is automatically secured by means of heat generated by the current in passing through a heating element acting upon a thermostatic bar to make and break the current. Our invention may thus be termed an automatic electric controller.

The object of thus controlling the current is to prevent the use of an electric current in such quantity and to such an extent as to produce undesirable or dangerous conditions of heat in the apparatus in which the current is being employed.

One of the objects of our invention is to provide means whereby the same apparatus may be used to control the current being used to more than one maximum. That is, to provide an apparatus which may be set to deliver a certain maximum amount of current and which may be re-set to deliver a certain other maximum amount of current, this adjustment being employed in connection with, but independent of a minor feature of adjustment which is capable of adjusting the maximum amount of current employed within smaller limits.

The features of our invention which we believe to be new and upon which we desire to obtain a patent will be herein set forth and then particularly defined by the claims which terminate this specification.

In the accompanying drawings, we have shown our invention in the forms of construction which we now prefer to use. It is, however, evident that many of the features of construction, especially in the details thereof, might be widely varied without affecting the essential characteristics of my invention.

Figure 1 shows our device with the inclosing case in longitudinal section and with a portion of the internal mechanism at the socket end thereof also in section.

Figure 2 is a bottom plan view of the device with the exterior casing in section.

Figure 5:
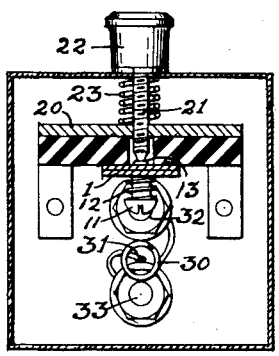

Figures 3, 4, and 5, are cross sections taken respectively on the lines 3—3, 4—4, 5—5, of Figure 1.

Figure 6:
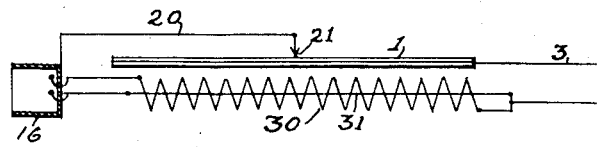

Figure 6 is a diagram showing the wiring plan of the device.

Figure 7:
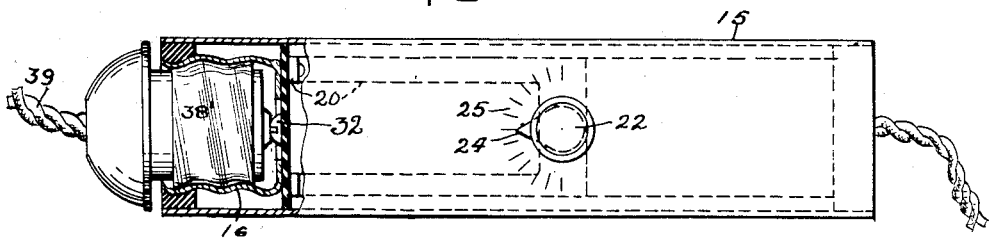

Figure 7 is an external top or plan view, excepting that the socket is shown in section.

Figure 8 is a cross section through the thermostatic bar and its support, showing a slight modification.

Automatic electric controllers of the type of our invention have been employed for controlling maximum amounts of electricity which may be employed and have been provided with an adjustable feature so that the amount of electricity employed may be controlled within a certain limited range. This range is, however, more limited than it is sometimes desired to employ. It has not been found feasible to secure as wide a range of use by the type of adjustment previously used, as is sometimes desired. We have, therefore, devised the present invention in which a plurality of heating elements are employed for heating the thermostatic element and these heating elements are placed in the circuit of applied electricity to be heated thereby. These two or more heating elements are each of different heat generating capacities and therefore, when the one having the greatest heating capacity is employed, the amount of electricity which it is possible to supply through this device is less than where a heating element or elements of lesser current carrying capacity is employed.

The thermostatic element 1, as herein shown, consists of two strips of metal having different coefficients of expansion under heat, these strips being joined integrally so that as they become heated, the excess expansion of one of the strips over the other will cause the bar to bend, which bending action is employed to make or break the current, depending upon whether the bar is brought back to its original position by cooling or is bent by heating. As herein shown, this bar 1, is secured with one of its faces against one face of a bar or base plate 2, which latter plate is preferably of an insulating material which is not injuriously affected by the heat radiated from the adjacent parts. This plate 2 would ordinarily be a non-conductor of electricity. It is shown as secured to, and supported by, a metal plate or arm 20, which also serves as a conductor for the electricity passing through the device.

The thermostatic bar 1 if fixedly secured to the insulating plate 2, should be so secured only at one end. For this purpose the screws 10 may be extended into the plate 2 but preferably these screws are employed merely as a means for connecting thereto the electric wire to which current is applied. In the present form of invention, the thermostatic bar 1 is used as one element of the circuit.

In either event, we prefer that the thermostatic bar 1 be yieldingly held to the base 2 at least at one end so that it is free to buckle upon being heated. One manner of doing this is to provide the free end thereof with a hole through which passes a securing bolt or screw 11, secured in the base 2, the head of which is distant from the bar 1, and not in contact therewith. A spring, as 12, is inserted between the head of the bolt 11 and the face of the bar 1. If desired, this bolt 11 and spring 12 may be duplicated towards the opposite end of the bar 1, and would be so duplicated when the screws 10 do not secure the end of the thermostatic bar 1 to the bar 2.

The holes in the bar 1, through which the screws 11 pass, should be sufficiently larger than the diameter of the screws, in the direction of the length of the bar, to permit a slight lengthwise movement of the bar as may be necessary to accommodate the buckling action of the bar 1. It is evident that the yielding connection between the ends of the bar 1 and the base 2, may be secured by employing springs of other type of construction. The type of spring employed for this purpose is not material to our invention.

The contact point which forms one part of the make and break mechanism, consists of a slight button 13, which is secured centrally of the length of the bar. The base 2 is provided with a hole at this point which receives this button. The metal plate 20, to which the base 2 is secured, is threaded and receives the threaded stem of an adjusting screw 21. This adjusting screw extends outward through the casing 15 and on its outer end is a head 22, or other means by which it may be conveniently adjusted. It is also provided with a pointer 24, which, in conjunction with a scale 25, carried by the casing 15, forms a guide by which to set the device.

The tip of the screw 21 forms the other part of the make-and-break contact device and by its adjustment, due to the turning of the same, will vary the amount of current which is permitted to flow, within certain limits, which, however, are restricted as compared to the range which may be secured by the greater adjustment which will be later described.

The thermostatic bar 1, is so placed that the layer thereof which is composed of the metal having the lesser coefficient of expansion, is next to the base 2. In consequence, when the bar becomes heated the central portion thereof will be buckled and forced away from the face of the base 2, while the ends thereof remain in contact with said base. This movement breaks contact between the two parts 13 and 21, and interrupts the flow of electric current until the bar 1 has cooled down to the point where, in straightening or coming back to its normal position, it renews contact between the two points 13 and 21.

We have shown two heating elements placed adjacent to the bar 1 and adapted to be inserted in the circuit to thereby be heated, and thus, through conduction and radiation, heat the thermostatic bar 1. One of the out-going leads, as the wire 3, is connected with one end of the thermostatic bar at 10. The other out-going lead is connected with each of the heating elements 30 and 31. The heating element 30 is shown as in the form of a helical coil, whereby a greater length and consequently a greater heating capacity, is obtained.

The other heating element 31 is a straight wire and this has been shown as placed within the coil of the other wire 30. While this disposition of the two elements is a desirable one, it is, however, not an essential feature. Both of these heating elements 30 and 31, are, in effect, resistance wires which have sufficient capacity for carrying the current to be supplied but insufficient to do this without heating.

One of these heating elements, as the wire 30, is connected with a post or screw 32, which is located centrally of the socket 16, which is secured in one end of the casing 15. The other wire 31, is secured to a similar screw or post 33, which is located towards the outer portion of the socket 16. In connecting the supply wires 39 to the device, a plug 38 is used, which screws into the socket 16.

This plug will vary in the construction of one of its contact members in accordance with whether the lower or the greater capacity of the controlling member is to be employed. If the greater supply of electricity is desired, the plug will have a member, as the disc 37, secured to its inner end, which disc is cupped, as shown in Figure 1, so that its outer edge projects beyond its center and thus contacts with the bolt 33 before it can contact any part of the plug with the bolt 32. In consequence, the current is passed through the conductor 31, which is the shorter and consequently has less heating capacity than the other conductor 30. In consequence, the thermostatic bar 1, will not be as quickly heated therefrom as it would be if the conductor 30 were being used to convey the current.

If the range of the current which it is desired to control be considerably less and one which can not be secured through the adjustment of the contact member 21, then another plug 38' is employed, the same being constructed after the plan indicated in Figure 7, in which a central contact member is employed which projects enough to contact with the centrally positioned bolt 32 and which will not contact any part of the plug with the outwardly placed bolt 33.

By providing a suitable kind of plug for each of the different apparatus which are to be controlled through our device, a possibility of making a mistake is eliminated. Apparatus which requires the larger amount of electricity would have a plug such as that shown in Figure 1, while apparatus which requires only a smaller amount of electricity would be provided with a plug such as is shown in Figure 7.

The central feature of our invention is the employment of a plurality of heating elements of different heating capacity, placed so as to heat the same thermostatic element and switch these heating elements into the circuit as will best fit the amount of current required by the different apparatus.

As is shown in Figures 1 and 5, the threaded bolt 21 which forms one of the electrodes, or make-and-break members, has its contacting tip within a hole or recess in the insulating plate 2 and the thermostatic bar 1 which carries the complemental electrode, or make-and-break member, contacts with the face of plate 2, when it is cooled. In consequence of this, withdrawal of the bolt 21 from the bar 1 by turning it in a backward direction will, due to positive restraining of the bar 1 by engagement thereof with the plate 2, act powerfully and positively to break any fusing effect which may have been caused by arcing or heating of the electrodes.

What we claim as our invention is:

1. A current controller comprising a conductive thermostatic bar yieldingly held at each end and adapted to buckle when heated, an electric heating element adapted to heat said bar, and a third member adapted to contact with the first named conductive bar at the middle of its length, all of said members being placed in series in the circuit being controlled.

2. A thermostatic current controller comprising two make-and-break terminals, one in the form of a thermostatic bar, yieldingly held at its ends and composed of two layers having unlike coefficients of expansion, and the other adapted to contact with the central portion of the first, and a heating element included in the circuit and positioned to heat the first named or bar terminal.

3. A device such as defined in claim 2 in which the second named terminal is adjustable toward and from the first.

4. A thermostatic electric controller comprising an insulating bar, a thermostatic bar secured against one face of said insulating bar by its ends and to permit relative lengthwise movement, a contact point passing through said insulating bar and engaging the central part of the thermostatic bar, said contact point having threaded adjustment relative to and transversely of the insulating bar, and a heating element placed in the circuit and extending alongside the said thermostatic bar and placed in series therewith.

5. In a thermostatic electric controller, the combination with a bar composed of two joined layers having different coefficients of expansion, of means for yieldingly holding its ends against a surface for relative movement lengthwise of the bar and a complemental contact member extending from beyond said surface and adapted to contact with the central portion of said bar and forming with said bar a make-and-break device for the current being controlled.

6. In a thermostatic electric controller, the combination with a bar composed of two joined layers having different coefficients of expansion, of means for yieldingly holding its ends against a surface to slide thereon and a complemental contact member extending from beyond said surface and adapted to contact with the central portion of said bar and forming with said bar, a make-and-break device for the current being controlled, and a resistance coil adjacent said thermostatic bar and placed in series therewith in the circuit being controlled.

7. In a thermostatic electric controller, the combination with a thermostatic element and means whereby it may make and break the circuit, of heating elements therefor, comprising a resistance coil and a resistance wire placed inside said coil, and means for selectively determining the inclusion of said heating elements in the circuit.

8. In a thermostatic electric controller, the combination with a thermostatic element and means whereby it may make and break the circuit, of heating elements therefor, comprising a resistance coil and a resistance wire placed inside said coil, and means comprising differently positioned contact terminals for each of said heating elements, whereby the one used may be selected.

9. In a thermostatic electric controller, the combination with a thermostatic element and means whereby it may make and break the circuit, of heating elements therefor, comprising a resistance coil and a resistance wire placed inside said coil, and means comprising a socket having a centrally located contact member connected with one of said heating elements and an eccentrically located contact member connected with the other heating element.

10. In a thermostatic controlling device, a thermostatic element comprising a base member, a bar composed of two layers of material having different coefficients of expansion, placed with the layer having the lesser coefficient against the surface of said base a contact member adapted to centrally engage the side of said thermostatic element at the side next the base, and securing means for said thermostatic element comprising springs supported from the base member and engaging each end of the thermostatic element to yieldingly hold it towards the base.

11. A thermostatic electric controller comprising a thermostatic bar composed of two joined layers having differing coefficients of expansion, a base bar to the face of which the thermostatic bar is yieldingly held at its ends, said thermostatic bar being placed with its layer having the lowest coefficient of expansion next to said base bar, a contact member adapted to centrally engage with the side of the thermostatic bar which is next to its base bar, said contact member and the thermostatic bar constituting a make-and-break device located in the circuit, and a heating member for said thermostatic bar also located in the same circuit.

Signed at Seattle, Washington, this 30th day of August, 1918.

PERRY V. McCASH.
MAURICE C. LEVINSON.